(12) United States Patent
Shariat et al.

(10) Patent No.: US 11,432,174 B2
(45) Date of Patent: Aug. 30, 2022

(54) TELECOMMUNICATIONS NETWORKS

(71) Applicant: Samsung Electronics Co., Ltd., Suwon-si (KR)

(72) Inventors: Mehrdad Shariat, Middlesex (GB); Andrew Bennett, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 16/592,536

(22) Filed: Oct. 3, 2019

(65) Prior Publication Data

US 2020/0112868 A1 Apr. 9, 2020

(30) Foreign Application Priority Data

Oct. 3, 2018 (GB) ...................................... 1816129
Sep. 12, 2019 (GB) ...................................... 1913200

(51) Int. Cl.
| | | |
|---|---|---|
| H04W 24/10 | (2009.01) | |
| H04W 8/08 | (2009.01) | |
| H04W 48/06 | (2009.01) | |
| H04W 48/16 | (2009.01) | |
| H04W 48/00 | (2009.01) | |
| H04W 60/04 | (2009.01) | |

(52) U.S. Cl.
CPC ............. *H04W 24/10* (2013.01); *H04W 8/08* (2013.01); *H04W 48/06* (2013.01); *H04W 48/16* (2013.01); *H04W 48/17* (2013.01); *H04W 60/04* (2013.01)

(58) Field of Classification Search
CPC ....... H04W 24/10; H04W 8/08; H04W 48/06; H04W 48/16; H04W 48/17; H04W 60/04; H04W 24/02
See application file for complete search history.

(56) References Cited

U.S. PATENT DOCUMENTS

| | | |
|---|---|---|
| 2009/0227251 A1 | 9/2009 | Lei et al. |
| 2016/0218948 A1 | 7/2016 | Djukic et al. |
| 2017/0054595 A1 | 2/2017 | Zhang et al. |
| 2017/0339688 A1 | 11/2017 | Singh et al. |
| 2018/0262924 A1 | 9/2018 | Dao et al. |
| 2019/0364541 A1 | 11/2019 | Ryu |
| 2020/0107250 A1* | 4/2020 | So .................. H04W 48/18 |
| 2020/0228420 A1 | 7/2020 | Dao et al. |
| 2021/0168651 A1* | 6/2021 | Marquezan ........... H04W 24/02 |

(Continued)

FOREIGN PATENT DOCUMENTS

| | | |
|---|---|---|
| WO | 2018008980 A1 | 1/2018 |
| WO | 2020/104969 A1 | 5/2020 |
| WO | 2020/143373 A1 | 7/2020 |

OTHER PUBLICATIONS

ISA/KR, International Search Report and Written Opinion of the International Searching Authority, International Application No. PCT/KR2019/012933, dated Jan. 13, 2020, 3 pages.

(Continued)

*Primary Examiner* — Walter J Divito

(57) ABSTRACT

A method of configuring a telecommunications network comprising the steps of collecting analytics data from a network (NAD) and analytics data (TAD) from at least one User Equipment (UE), analyzing said NAD and TAD and configuring at least one network feature according to the NAD and the TAD.

8 Claims, 10 Drawing Sheets

(56) References Cited

U.S. PATENT DOCUMENTS

2021/0168705 A1\* 6/2021 Fiorese ................ H04W 12/06
2021/0288886 A1\* 9/2021 Örtenblad ........... G06F 9/45558

OTHER PUBLICATIONS

3GPP TS 29.520 V15.0.0 (Jun. 2018), Technical Specification, 3rd Generation Partnership Project; Technical Specification Group Core Network and Terminals; 5G System; Network Data Analytics Services; Stage 3 (Release 15), Jun. 2018, 32 pages.
Kddi, "New solution (Key issue 10): NWDAF service to provide recommendation for NF instance selection," S2-186446, SA WG2 Temporary Document, SA WG2 Meeting #128, Vilnius, Lithuania, Jul. 2-6, 2018, 3 pages.
"3rd Generation Partnership Project; Technical Specification Group Services and System Aspects; System Architecture for the 5G System; Stage 2 (Release 15)", 3GPP TS 23.501 V15.2.0 (Jun. 2018), 216 pages.
"3rd Generation Partnership Project; Technical Specification Group Services and System Aspects; Study of Enablers for Network Automation for 5G (Release 16)", 3GPP TR 23.791 V0.5.0 (Jul. 2018), 48 pages.
Samsung, "Use Case on UE-driven analytics sharing", SA WG2 Meeting #127-bis, May 28-Jun. 1, 2018, 2 pages, S2-185816 (was S2-185702).
Samsung, "Solution: UE-driven analytics sharing", SA WG2 Meeting #128-Bis, Aug. 20-24, 2018, S2-187903, 3 pages.
Lenovo et al., "New Key Issue: UE driven analytics sharing", SA WG2 Meeting #128, Jul. 2-6, 2018, S2-186921, 2 pages.
Samsung et al., "Updates to UE driven analytics solution 16", SA WG2 Meeting #129BIS, Nov. 26-30, 2018, S2-1812274, 6 pages.
Office Action dated Jan. 28, 2020 in connection with United Kingdom Patent Application No. GB1913200.0, 7 pages.
Examination Report dated Jan. 25, 2021 in connection with United Kingdom Patent Application No. GB1913200.0, 4 pages.
Huawei et al., "Solution for Key Issue 4 to help OAM perform Slice Resource Adjustment", SA WG2 Meeting #128bis, Aug. 20-24, 2018, S2-188266, 6 pages.
European Patent Office, "Extended European Search Report" dated Nov. 5, 2021, in connection with counterpart European Application No. 19868372.4, 13 pages.
3GPP TR 23.791 V1.0.0 (Sep. 2018); Technical Report; 3rd Generation Partnership Project; Technical Specification Group Services and System Aspects; Study of Enablers for Network Automation for 5G (Release 16), Sep. 2018, 66 pages.

\* cited by examiner

TELECOMMUNICATIONS NETWORKS

CROSS-REFERENCE TO RELATED APPLICATION

This application is based on and claims priority under 35 U.S.C. 119 to United Kingdom Patent Application No. 1816129.9 filed on Oct. 3, 2018 and United Kingdom Patent Application No. 1913200.0 filed on Sep. 12, 2019, the disclosures of which are herein incorporated by reference in their entirety.

BACKGROUND

1. Field

The present disclosure relates to an improved means of improving the performance of a telecommunications network. It makes use, in particular, of analytics data which is collected at a User Equipment (UE) and used in conjunction with network analytics data. Here, UE refers to a mobile device, vehicle, sensor or any other device operable to support 5G broadband cellular network radio technologies.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In prior art networks, it is usual to collect analytics data in the network, wherein said data is collected at various network entities and used to inform the operation of the network and to improve its performance.

In the prior art, a lot of data is generated by the UEs in the system, but this data is not routinely used in optimizing or improving the network. Embodiments of the present disclosure aim to provide an improved network optimization procedure, utilizing information available at the UE.

3GPP is currently standardizing what is known as Service-Based Architecture (SBA) for the Fifth Generation (5G) Core as part of System Architecture for 5G systems in Release 15. In SBA, different network functions and associated services can directly communicate with each other as Originator or Consumer of a service via a common bus known as Service-based Interface (SBI). One Key function envisioned within SBA is Network Data Analytics Function (NWDAF), enabling network function access to the Operator-driven analytics for different purposes including intelligent slice selection and control. In Release 16, 3GPP intends to improve NWDAF scope via introducing use cases and solutions for supporting network automation deployment.

There are already established services within next generation service-based Core Network (CN) to access operator-specific analytics (NWDAF). The current defined services are mainly envisioned to share such information within the CN between different Network Functions (NFs). Policy Control Function (PCF) and Network Slice selection Function (NSSF) at cross-slice level are currently envisioned as the key consumers of such services.

UEs are natural data collection points to gather more localized analytics within the network. New enhancements can be defined for NWDAF and/or other NFs to leverage UE-driven analytics in order to improve slice selection at UE-level. Such information may help the NWDAF to make more intelligent decisions on slice selection (e.g. to switch from a slice with more flexible resources to a resilient one or vice versa).

SUMMARY

According to a first aspect of the present disclosure, there is provided a method of configuring a telecommunications network comprising the steps of collecting analytics data from a network, NAD, and analytics data, TAD, from at least one User Equipment, UE, analyzing said NAD and TAD and configuring at least one network feature accordingly.

In an embodiment, the method further comprises the step of determining if there is a change in QoE and, if so, obtaining the TAD from NWDAF and then combining with observed NAD.

In an embodiment, after combining, determining if at least one network feature is to be updated and, if so, updating the at least one network feature.

In an embodiment, the at least one network feature is a network slice.

In an embodiment, the slice mapping is updated per UE or plurality of UEs.

In an embodiment, in order to enable TAD settings on the UE, the following steps are performed: NWDAF invokes a transfer operation on an appropriate AMF including the UE Configuration Update Command message container, wherein the container includes a TAD Settings Information Element; the AMF sends a UE Configuration Update Command towards the UE; the UE sends a UE Configuration Update Complete towards the AMF; and if the NWDAF has previously requested notification, the AMF will invoke notify operation.

In an embodiment, in order to acquire TAD from a UE, the following steps are performed: NWDAF subscribes to AMF to be informed of all Registration Requests containing a TAD Information Element; the AMF completes NWDAF subscription request and responds; the AMF receives a registration request from the UE including TAD; the AMF notifies corresponding NWDAF to which it has already subscribed; the NWDAF uses a Namf_TAD_GET Request message to retrieve the TAD; and the AMF responds with TAD to the NWDAF.

In an embodiment, in order to acquire TAD from a UE, the following steps are performed: NWDAF subscribes to AMF event exposure service, providing a "TAD Update" Event ID to be informed of occurrences of this event; the AMF responds to the NWDAF subscription, also providing subscription correlation ID; and the UE sends a Registration Request that includes TAD, which triggers notification of the event towards the NWDAF together with the new TAD.

In an embodiment, acquiring TAD from a UE may be performed according an event-based trigger or a timer-based trigger.

In an embodiment, an event-based trigger comprises one or more of: a change in UE QoE; average or median of packet latency; packet error rate; and average or median of packet jitter.

In an embodiment, a timer-based trigger is defined for an individual Subscription Permanent Identifier, SUPI, a set of SUPIs or for all SUPIs.

In an embodiment, there is further provided the steps of: NWDAF subscribes to a TAD Update event from AMF for a particular UE, a group of UEs, or all UEs; the AMF responds to the subscription request, including a correlation ID; at a later point in time, set by a timer value, the UE performs a Registration Request, and includes new TAD IE as part of the Registration Request; and the AMF reports the new TAD to the NWDAF including also AMF ID and correlation ID for the TAD Update Event ID.

In an embodiment, there is further provided the steps of: NWDAF receives load level notifications for network slice instances; the NWDAF compares its knowledge of past load levels for the network slice instances that S-NSSAI-A can be mapped to with past TAD information on QoE experienced by one or more UEs using S-NSSAI-A; the NWDAF determines that in certain locations, at certain times, QoE levels provided to UEs by a network slice instance drops significantly but is within targets for UEs using other instances; the NWDAF creates a new selection policy that sends more UEs to the other network slice instances at certain times, and in certain locations; NWDAF notifies NSSF that the selection policy has changed and provides a newly proposed slice selection policy update; a UE initiates a Registration Request towards the AMF, including a Requested NSSAI that contains S-NSSAI-A; the AMF requests the NSSF to provide the Allowed NSSAI; the NSSF selects a slice instance to serve S-NSSAI-A based on the updated selection mapping policy received from the NWDAF; the NSSF provides the Allowed NSSAI to the AMF; and the AMF sends a Registration Accept message to the UE.

In an embodiment, there is further provided the steps of: NWDAF receives load level notifications for network slice instances; the NWDAF compares its knowledge of past load levels for the network slice instances that S-NSSAI-A can be mapped to with past TAD information on QoE experienced by UEs using S-NSSAI-A; the NWDAF determines that in certain locations, at certain times, QoE levels provided to UEs by a network slice instance drops significantly, but is within targets for UEs using other instances; the NWDAF updates subscribed S-NSSAI; UDM update triggers a notification to AMF on new S-NSSAI; the AMF invokes a User Configuration Update to the UE to notify S-NSSAI changes; the UE confirms User Configuration Update complete; the UE initiates a Registration Request towards the AMF, including a Requested NSSAI that contains the new S-NSSAI; the AMF requests the NSSF to provide a slice instance based on the requested NSSAI; and the NSSF selects a slice instance to serve the new S-NSSAI.

According to a second aspect of the present disclosure, there is provided an apparatus arranged to perform the method of the first aspect.

According to the present disclosure there is provided an apparatus and method as set forth in the appended claims. Other features of the disclosure will be apparent from the dependent claims, and the description which follows.

To efficiently incorporate Terminal Analytics into NWDAF, some key issues need to be addressed including type of Terminal analytics update, triggers to generate such analytics and procedures to share such analytics with NWDAF within 5G core (CN). Embodiments of this disclosure relate to some key types of terminal analytics and methods/procedures to efficiently share/incorporate such analytics.

According to the present disclosure, there is provided a method of configuring a telecommunications network comprising the steps of collecting analytics data from a network (Network Analytics Data, NAD) and analytics data from at least one user equipment (Terminal Analytics Data, TAD), analyzing said network and user equipment analytics data and configuring at least one network feature accordingly.

Suitably, this allows the network to take into account the experience of one or more UEs in the network, using data which is only available to the UEs, thereby allowing the network to better configure itself by making use of this data which would otherwise be invisible to it.

By making use of signaling in the control plane (CP), use is made of pre-existing messaging systems and protocols wherever possible. New information elements are defined where needed, but these are made to conform, where possible with pre-existing schemes.

Suitably, analytics data is collected from a plurality of user equipments.

Suitably, one or more triggers are defined which are used to enable reporting of TAD. These triggers can be event-based and/or time-based, as required.

Suitably, event-based triggers may be based on a change in QoE for one or more UEs.

Suitably, such triggers can include one or more of:

Average or median of packet latency;

Packet error rate

Average or median of packet jitter.

Suitably, time-based triggers include UE registration requests.

Suitably, the at least one network feature includes slice selection.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
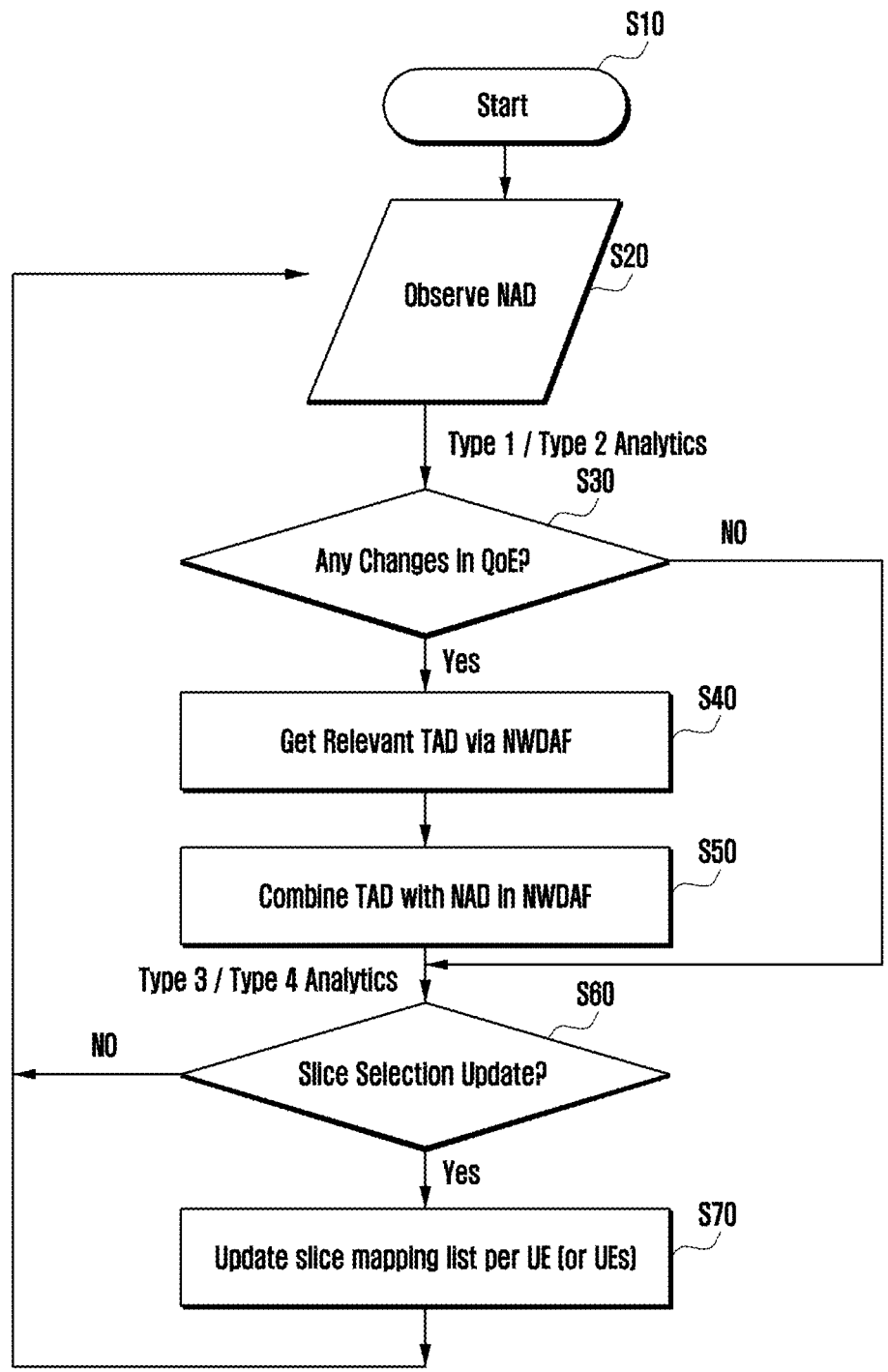
FIG. 1 shows a flowchart illustrating a method according to an embodiment of the present disclosure.

FIGS. 1 through 10, discussed below, and the one or more embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of one or more embodiments of the disclosure as defined by the claims and their equivalents. It includes various specific details to assist in that understanding but these are to be regarded as merely exemplary. Accordingly, those of ordinary skill in the art will recognize that various changes and modifications of the one or more embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of one or more embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the one or more embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

In accordance with an aspect of the disclosure, a method of indicating an SP SRS as a reference signal by a terminal is provided. The method includes receiving, from a base station, information for a sounding reference signal (SRS) configuration, receiving, from the base station, a medium access control (MAC) control element (CE) for activating a semi-persistent (SP) SRS, and transmitting, to the base station, an SRS on a first cell based on the information for the SRS configuration and the MAC CE for activating the SP SRS, wherein the MAC CE for activating the SP SRS includes an indicator for indicating whether serving cell information and bandwidth part (BWP) information for a reference signal associated with spatial relationship are present.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more central processing units (CPUs) within a device or a security multimedia card.

To identify key useful terminal analytics i.e. analytics derived from or associated with the UE, it is important to first establish generic types of analytics that can be useful for the network according to the known art:
 1. Descriptive—What is happening now based on incoming data.
 2. Diagnostic—A look at past performance to determine what happened and why.
 3. Predictive—An analysis of likely scenarios of what might happen.
 4. Prescriptive—This type of analysis reveals what actions should be taken.

From analytics' value perspective, Type 1 or Type 2 data analytics can be generated in rather large volumes depending on key parameters under observation. However, there is little value in such analytics, since there are already established Key Performance Indicators (KPIs) logged by network Operators to implicitly or explicitly log and store such analytics.

On the other hand, Type 3 or Type 4 analytics, can be more valuable for network operation as they enable an Operator to predict an event (e.g. network overload, an upcoming outage or failure) earlier than would otherwise be the case and then to adopt suitable preemptive actions to ensure smooth network operation.

Mobile Terminals (UEs) can closely monitor a device experience on different aspects (thanks to different types of sensors, positioning and profiling systems they have access to). This enables a mobile terminal to generate some key predictive or prescriptive analytics (i.e. Type 3 or Type 4 analytics) or relevant context for network to generate such analytics based on Type 1 or Type 2 data.

Examples of Terminal Analytics Data (TAD) include: (1) Mobility-related analytics; and (2) Communication-related analytics.

In the first category, more concrete examples include finer granularity of positioning information beyond Tracking Area (TA) or Cells (e.g. proximity information on relative distance and/or relative direction with respect to other UEs within the same network) and velocity/acceleration information determining expected changes in speed and/or direction of movement by a UE or group of UEs.

In the second category, more concrete examples include group Identifiers (either Internal or External) where data cannot be exposed to the core network (5GC) from application servers to identify users interacting with each other (for different services like proximity-based applications, network-controlled interactive services or even over-the-top application services).

Embodiments of the disclosure provide automated network configurations based on TAD. Specific examples relate to network slices, although this is exemplary only and not intended to be limiting. A Network Slice is a complete logical network including Radio Access Network (RAN) and Core Network (CN). It provides telecommunication services and network capabilities, which may vary (or not) from slice to slice. Distinct RAN and Core Network Slices will exist. A device may access multiple Network Slices simultaneously through a single RAN. The use of network slices, or other concepts, in this description is to exemplify network operation and is not intended to be limiting. Other network configurations may be improved or optimized according to embodiments of the present disclosure.

Example 1

The network diagnoses that the user's (or users') Quality of Experience (QoE) on a slice (e.g. slice A) has suddenly degraded at instance T. Via combining this Network diagnostic Analytics Data (Type 2) with Terminal Analytics Data on positioning information (at instance T), the network identifies that the QoE degradation has happened when users from a specific location (e.g. Zone M) have subscribed and selected slice A. The network also identifies other users from the same Zone M are functioning acceptably on slice B with similar capabilities as slice A. As a result, for future slice selection intervals, the network puts slice A in a black list for users from Zone M and provides slice B as an alternative option (as Type 4 analytics). This alleviates the level of loading on slice A and prevents upcoming users from perceiving a degraded QoE.

Example 2

The network diagnoses that a certain user's (or users') QoE on a slice (e.g. slice C) has degraded at different time instances. Via combining this Network diagnostic Analytics Data (Type 2) with Terminal Analytics Data on velocity information, the network identifies that the QoE degradation happened when users have reached a certain velocity (e.g. V). The network also identifies that another slice (e.g. slice D with similar capabilities as slice C), is quite resilient for users at higher speeds. As a result, for future slice selection intervals, the network puts slice C in a black list for users at velocity V (and beyond) (Type 3 analytics) and provides slice D as an alternative option. This ensures that users at different velocities experience more consistent QoE across different slices.

The flow chart of FIG. 1 shows how Type 3 or Type 4 analytics data can be generated via combining Terminal Analytics Data (TAD) with Network Analytics Data (NAD) in line with the above examples.

In more detail, flow starts at S10. At S20, Type 1/Type 2 Analytics are produced by observing NAD, At S30, a determination is made as to whether QoE has changed. If not, flow continues to S60. If the QoE has changed, then at S40 relevant TAD are obtained via NWDAF and, at S50, these are combined with NAD in the NWDAF to yield Type 3/Type 4 Analytics.

At S60, a decision is made as to whether Slice selection is updated. If not, flow returns to S20. If the slice is to be updated, then at S70, slice mapping in updated per UE (or multiple UEs) as required. From there, flow returns to S20.

Procedure 1: To Collect Analytics on the UE

Multiple procedures can run as part of the software environment of a UE to collect different types of analytics (identified by different Procedure IDs). Here, such procedures are collectively termed "Procedure 1". It is assumed that NWDAF is aware of Procedure IDs and the nature of the analytics data generated by each procedure.

Procedure 2: To Enable TAD Settings on the UE

In order to enable TAD settings, NWDAF invokes a handshake messaging with the UE (via established N1 signaling messages of the Access and Mobility Management Function—AMF) within the Core.

Figure 2:
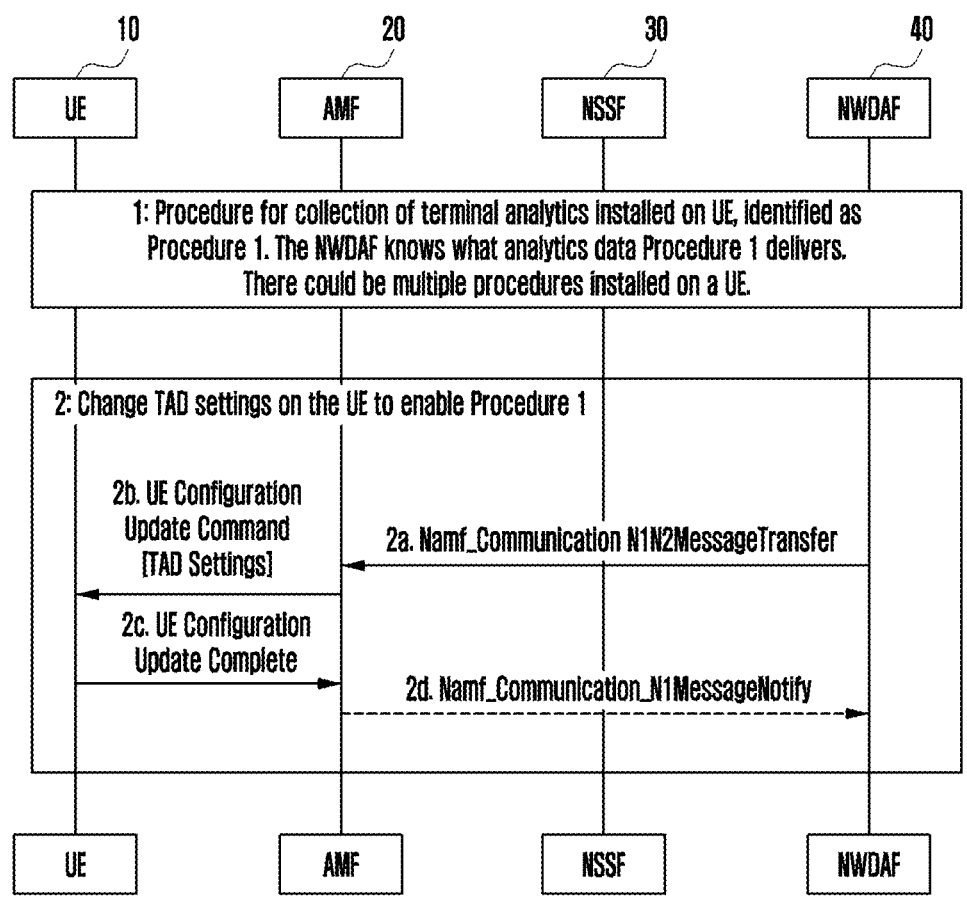
FIG. 2 shows a message exchange according to an embodiment of the present disclosure.

In particular, the following steps form part of Procedure 2, as shown in FIG. 2:

2a. The NWDAF invokes the Namf_Communication_ N1N2MessageTransfer operation on the appropriate AMF including the UE Configuration Update Command message container. This container includes the TAD Settings IE (a proposed new IE).

2b. The AMF sends the UE Configuration Update Command towards the UE. (If the UE is idle the network triggered service request procedure is performed, if delivery of the TAD Settings IE is urgent.)

2c. The UE sends the UE Configuration Update Complete towards the AMF.

2d. If the NWDAF has previously requested notification the AMF will invoke the Namf_Communication_ N1MessageNotify operation.

Procedure 3: To Share TAD with NWDAF

In order to share TAD generated as part of Procedure 1 with NWDAF 40, embodiments of the disclosure get the information from the UE 10 via established N1 signaling messages to the AMF 20 as a new Information Element (IE) added to the Registration Request of the UE.

Figure 3:
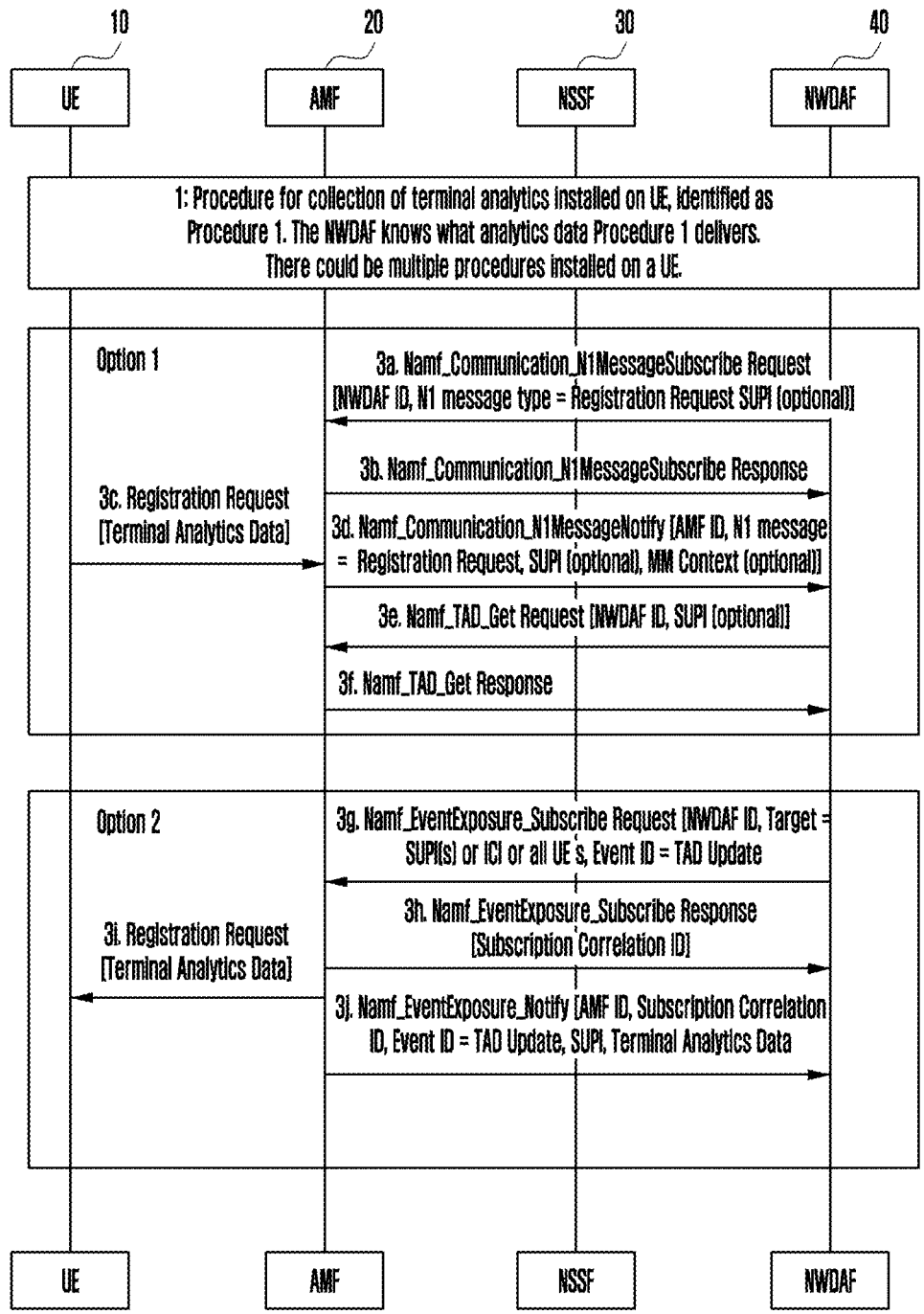
FIG. 3 shows two options for sharing analytics between a UE and the network according to embodiments of the present disclosure.

Two options can be considered on how the NWDAF 40 gets the information from the AMF 20. The corresponding procedures are illustrated as two options in FIG. 3, which illustrates the message exchanges associated with each option:

Option1: In particular, the below steps form part of Procedure 3-Option 1 as also shown in FIG. 3:

3a. NWDAF 40 subscribes to AMF 20 to be informed of all Registration Requests containing the TAD IE.

3b. AMF 20 completes NWDAF 40 subscription request and responds.

3c. AMF 20 receives a registration request from UE 10 incl. TAD data.

3d. AMF 20 notifies corresponding NWDAF 40 as it has already subscribed to.

3e. NWDAF 40 uses the newly proposed service, Namf_TAD_GET Request message to retrieve the Terminal Analytics. The notification applies for all UEs so either the Namf_TAD_GET request would be for a single UE (uniquely identified by a 5G Subscription Permanent Identifier—SUPI as an optional input) or it would be a batch request. The NWDAF could specify a particular SUPI when it subscribes for notifications.

3f. AMF 20 responds with TAD data to NWDAF 40.

Option2: The following steps form part of Procedure 3-Option 2 as also shown in FIG. 3:

3g. NWDAF 40 subscribes to AMF 20 event exposure service, providing a newly proposed "TAD Update" Event ID to be informed of occurrences of this event. This subscription can be for an individual SUPI, or set of SUPIs, or all.

3h. AMF 20 responds to NWDAF 40 subscription, also providing subscription correlation ID.

3i. UE 10 sends a Registration Request that includes Terminal Analytics Data.

3j. this triggers the notification of the event towards the NWDAF 40 together with the new Terminal Analytics Data.

The UE checks the size of TAD, so as not to exceed the limit set by NG-RAN. If the size is under the limit defined by NG-RAN, then the UE includes the TAD in a single UL NAS TRANSPORT message (N1). Alternatively, if the size exceeds the limit, the UE splits the TAD into a plurality of smaller UL NAS TRANSPORT messages (N1) to be sent separately, each under the limit defined by NG-RAN. In a further alternative, if the size exceeds the limit (or if the control plane experiences temporary congestion), then the UE may compress the TAD or transfer partial TAD, below the size limit defined by NG-RAN Triggers for Terminal Analytics As the above proposed procedures to share Terminal Analytics with NWDAF may be required more frequently than a single Registration Request or at specified times, embodiments of the disclosure comprise two types of triggers for the above procedures.

Event-based triggers

Timer-based triggers

Event-Based Triggers:

Events can be defined (e.g. mobility of the UE into a new area, periodic registration expiry) which invoke a Registration Request by a UE. These may originate from changes in device QoE e.g. due changes in network or slice-level loading status that can be measured by certain KPIs, such as:

Average or median of packet latency;

Packet error rate

Average or median of packet jitter.

Timer-Based Triggers for Terminal Analytics:

Alternatively, time intervals can be defined as Triggers to invoke UE Registration Request. The intervals can be set for an individual SUPI, or set of SUPIs or for all.

The Interval for the TAD collection can be set in such a way as to ensure minimal impact beyond existing NAS signaling on UE power consumption. According to an embodiment of the disclosure, it is assumed that the interval can be dynamically (yet individually) set based on the UE level of power consumption/battery usage. The interval can be made longer (less frequent) if the UE is in a power saving mode. The interval can be made shorter (more frequent) if the UE has sufficient power based on device-level estimated battery life or other power depletion metrics.

Figure 4:
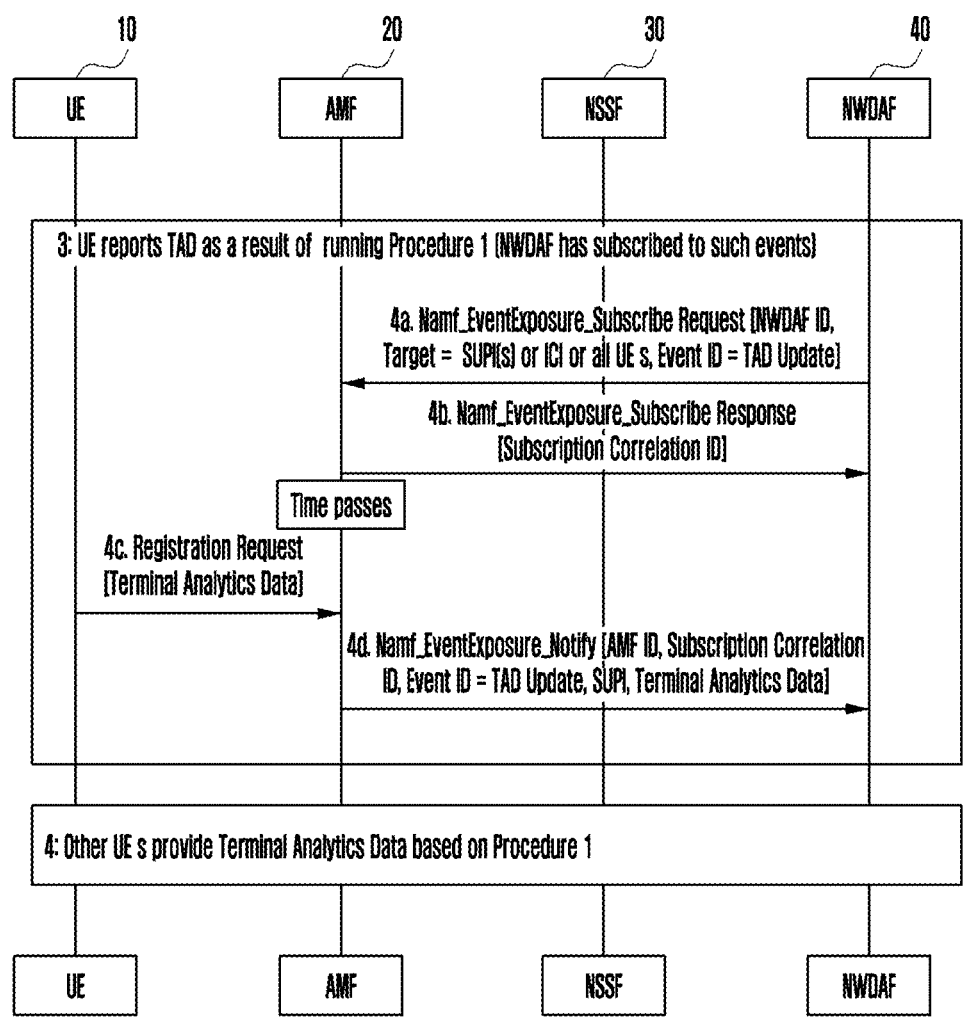
FIG. 4 shows a message exchange according to an embodiment of the present disclosure.

FIG. 4 shows an example call flow for Procedure 3 based on Option 2 with timer-based triggers for TAD. In more detail, the following steps are illustrated:

4a. The NWDAF 40 subscribes to the TAD Update event from AMF 20 (a newly proposed event according to an embodiment of the disclosure). This can be for a particular UE 10, group of UEs, or all UEs. The event reporting can also be set for particular areas of interest.

4b. The AMF 20 responds to the subscription request, including a correlation ID.

4c. At some later point in time (set by the timer value), the UE 10 performs a Registration Request, and includes the new Terminal Analytics Data IE as part of that.

4d. The AMF 20 reports this data to the NWDAF 40 including also AMF ID and correlation ID for the TAD Update Event ID.

Procedure 4: Similar Procedures as Above May be Followed for all UEs to Provide TAD.

In particular, the procedures 1-3, set out above, can be repeated for several UEs to collect TAD data.

Procedure 5: To Update Slice Selection

The NWDAF 40 compares its knowledge of past load levels for the (potential) network slice instances that can support target UEs' with past TAD information on the QoE experienced by the UEs.

It determines that in certain locations, at certain times, the QoE levels provided to UEs by one of the network slices instances drops significantly but is within targets for UEs using the other instances (similar to Example 1).

It creates a new selection policy that sends more UEs to the other network slice instances at certain times, and in certain locations. In particular, NWDAF 40 notifies the NSSF 30 that the selection policy has changed and provides the new policy.

Two alternative variants for steps in the Procedure to update slice selection can be considered:

In one variant, the Single Network Slice Selection Assistance Information (S-NSSAI) stays the same after applying the new policy (e.g. S-NSSAI-A) while mapping the user to a new instance (Transparent to the UE).

In second variant, the S-NSSAI changes after applying the new policy (e.g. from S-NSSAI-A to S-NSSAI-B) while mapping the user to a new instance.

Figure 5:
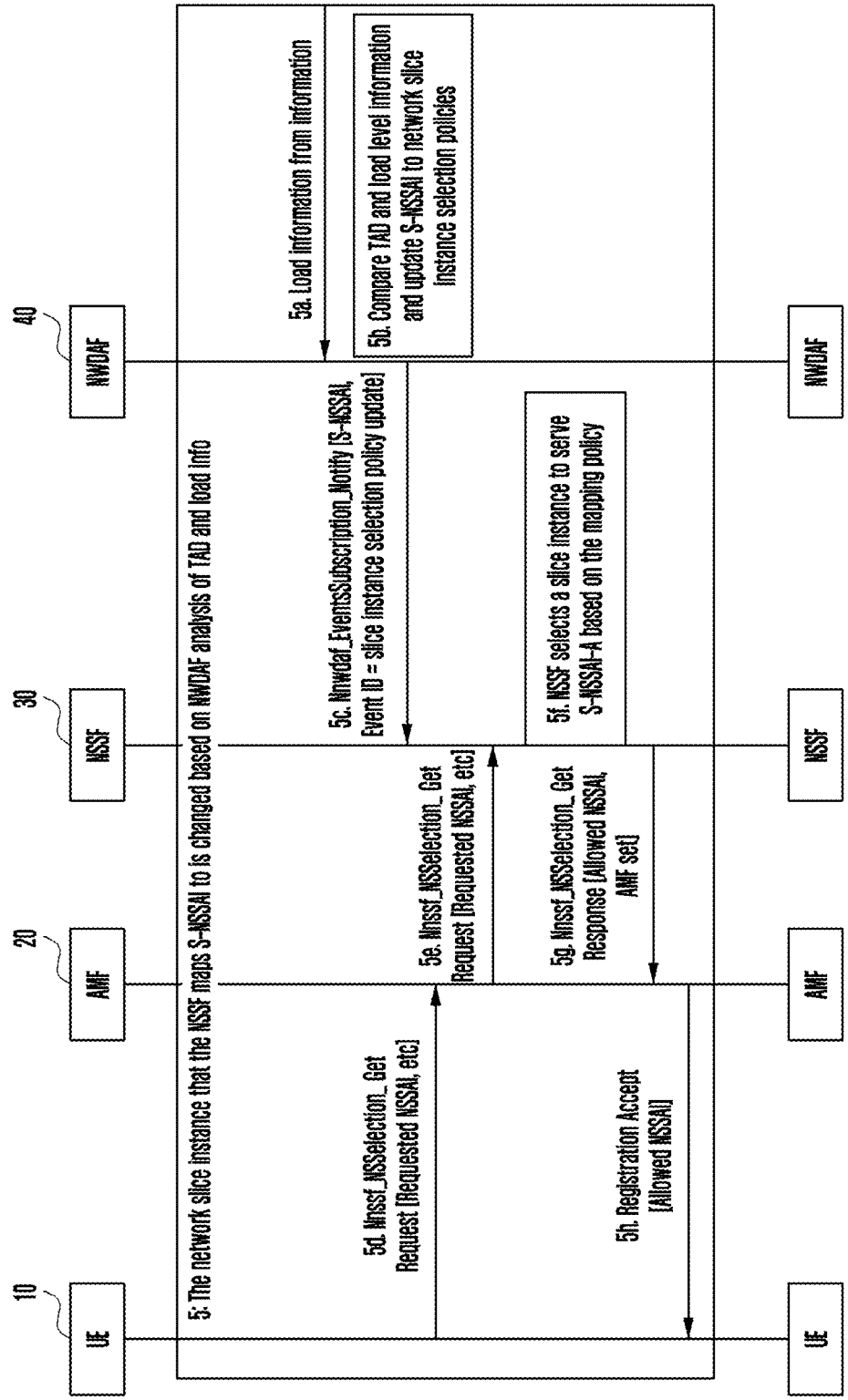
FIG. 5 shows a message exchange according to an embodiment of the present disclosure.
Figure 6:
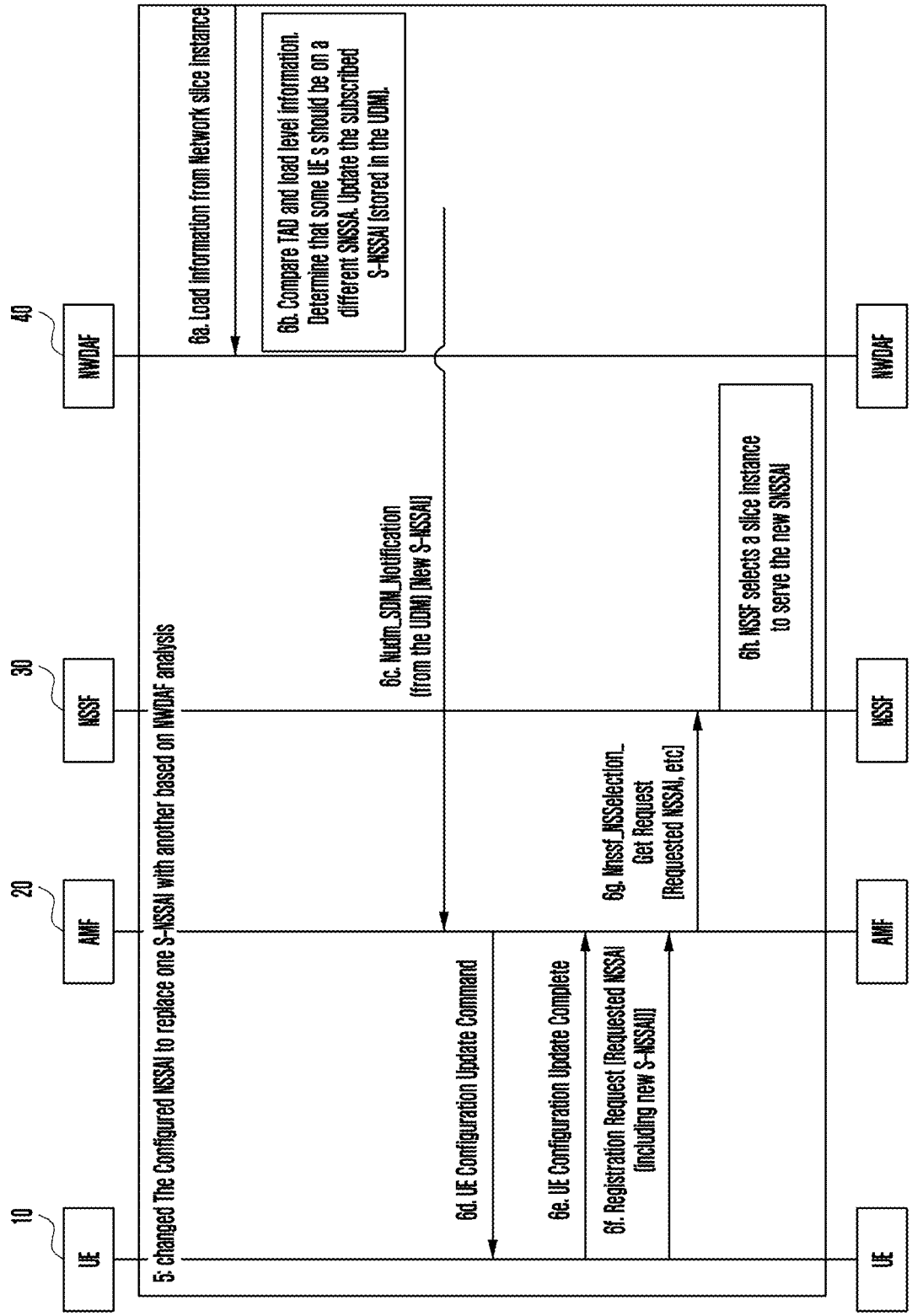
FIG. 6 shows a message exchange according to an embodiment of the present disclosure.

FIGS. 5 and 6 illustrate example call flows or message exchanges for Procedure 5 based on the two alternative variants described above. In Procedure 5, variant 1, the following steps are illustrated in FIG. 5:

5a. The NWDAF 40 receives load level notifications for network slice instances.

5b. The NWDAF compares its knowledge of past load levels for the network slice instances that S-NSSAI-A can be mapped to with past TAD information on the QoE experienced by UEs using S-NSSAI-A. It determines that in certain locations, at certain times, the QoE levels provided to UEs by one of the network slices instances drops significantly but is within targets for UEs using the other instances. It creates a new selection policy that sends more UEs to the other network slice instances at certain times, and in certain locations.

5c. The NWDAF 40 notifies the NSSF 30 that the selection policy has changed and provides the newly proposed slice selection policy update.

5d. A UE 10 initiates a Registration Request towards the AMF 20, including a Requested NSSAI that contains S-NSSAI-A.

5e. The AMF requests the NSSF to provide the Allowed NSSAI, etc.

5f. The NSSF selects a slice instance to serve S-NSSAI-A based on the updated selection mapping policy received from the NWDAF.

5g. The NSSF provides the Allowed NSSAI, etc. to the AMF. (The network slice instance selected is transparent to the UE, it still gets the S-NSSAI-A back in the Allowed NSSAI that it requested.)

5h. The AMF sends the Registration Accept to the UE.

In Procedure 5, variant 2, the following steps are illustrated in FIG. 6:

6a. The NWDAF 40 receives load level notifications for network slice instances.

6b. The NWDAF compares its knowledge of past load levels for the network slice instances that S-NSSAI-A can be mapped to with past TAD information on the QoE experienced by UEs using S-NSSAI-A. It determines that in certain locations, at certain times, the QoE levels provided to UEs by one of the network slices instances drops significantly, but is within targets for UEs using the other instances. It updates subscribed S-NSSAI (stored within UDM).

6c. UDM update triggers a notification to AMF 20 on new S-NSSAI (e.g. S-NSSAI-B).

6d. AMF invokes a User Configuration Update to UE 10 to notify S-NSSAI changes.

6e. UE confirms User Configuration Update Complete.

6f UE initiates a Registration Request towards the AMF 20, including a Requested NSSAI that contains S-NS-SAI-B.

6g. The AMF requests the NSSF 30 to provide a slice instance based on the requested NSSAI, etc.

6h. NSSF selects a slice instance to serve the new S-NSSAI (S-NSSAI-B).

Figure 7:
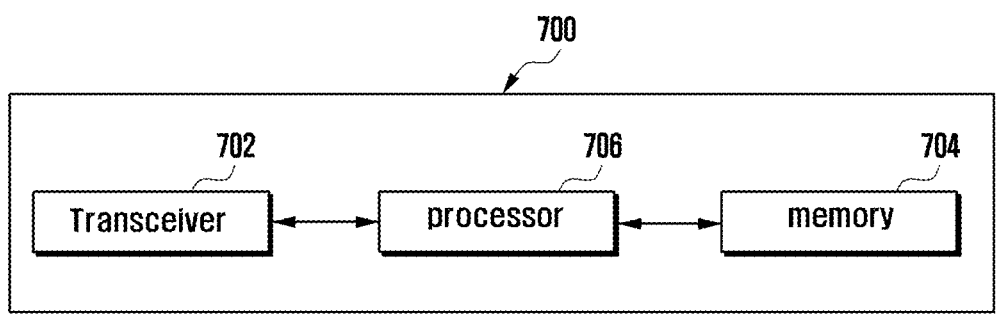
FIG. 7 illustrates a block diagram of a UE according to one embodiment of the present disclosure.

FIG. 7 illustrates a block diagram of a UE 700 according to one embodiment of the present disclosure.

With reference to FIG. 7, a UE 700 of embodiments includes a transceiver 702, a memory 704 and a processor 706.

The transceiver 702 is capable of transmitting/receiving signals to/from RAN or base station or AMF via the RAN.

The memory 704 is capable of storing at least one of the following: information related to the UE and information transmitted/received via the transceiver 702.

The processor 706 is capable of controlling operations of the UE 700. The processor 706 is capable of controlling the UE 700 to perform operations in the above described embodiments.

Figure 8:
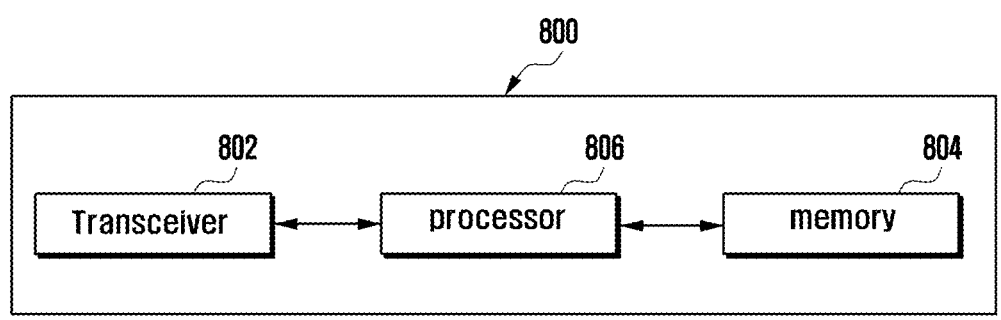
FIG. 8 illustrates a block diagram of an AMF according to one embodiment of the present disclosure.

FIG. 8 illustrates a block diagram of an AMF 800 according to one embodiment of the present disclosure.

With reference to FIG. 8, an AMF 800 of embodiments includes a transceiver 802, a memory 804 and a processor 806.

The transceiver 802 is capable of transmitting/receiving signals to/from RAN or base station or NSSF or UE.

The memory 804 is capable of storing at least one of the following: information related to the UE and information transmitted/received via the transceiver 802.

The processor 806 is capable of controlling operations of the AMF 800. The processor 806 is capable of controlling the AMF to perform operations in the above described embodiments.

Figure 9:
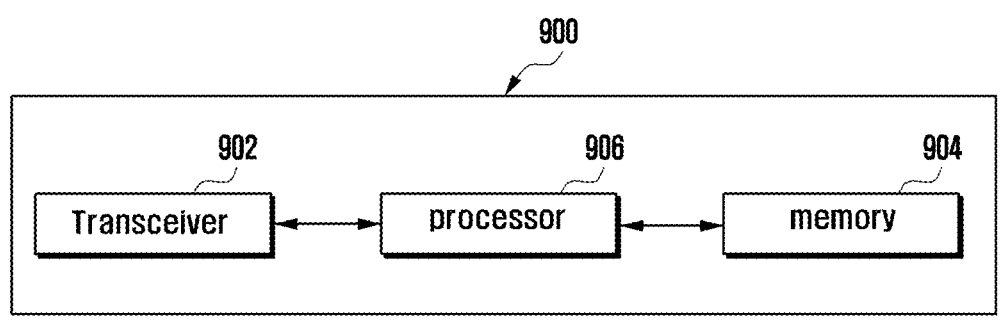
FIG. 9 illustrates a block diagram of a NSSF according to one embodiment of the present disclosure.

FIG. 9 illustrates a block diagram of an NSSF 900 according to one embodiment of the present disclosure.

With reference to FIG. 9, an NSSF 900 of embodiments includes a transceiver 902, a memory 904 and a processor 906.

The transceiver 902 is capable of transmitting/receiving signals to/from AMF or NWDAF.

The memory 904 is capable of storing at least one of the following: information related to the UE and information transmitted/received via the transceiver 902.

The processor 906 is capable of controlling operations of the NSSF 900. The processor 906 is capable of controlling the NSSF to perform operations in the above described embodiments.

Figure 10:
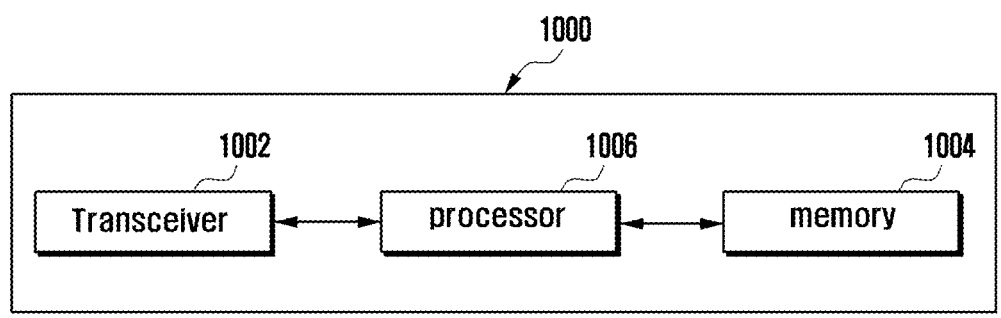
FIG. 10 illustrates a block diagram of a NWDAF according to one embodiment of the present disclosure.

FIG. 10 illustrates a block diagram of an NWDAF 1000 according to one embodiment of the present disclosure.

With reference to FIG. 10, an NWDAF 1000 of embodiments includes a transceiver 1002, a memory 1004 and a processor 1006.

The transceiver 1002 is capable of transmitting/receiving signals to/from the AMF.

The memory 1004 is capable of storing at least one of the following: information related to the UE and information transmitted/received via the transceiver 1002.

The processor 1006 is capable of controlling operations of the NWDAF 1000. The processor 1006 is capable of controlling the NWDAF 1000 to perform operations in the above described embodiments.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although the present disclosure has been described with one or more embodiments, various changes and modifications may be suggested to one skilled in the art. It is intended that the present disclosure encompass such changes and modifications as fall within the scope of the appended claims.

What is claimed is:

1. A method performed by a network data analytics function (NWDAF) entity in a communication system, the method comprising:

subscribing to an event exposure service of an access and mobility management function (AMF) entity, wherein the event exposure service is for notification of an event based on registration of a user equipment (UE);

identifying first information associated with the UE registered to single-network slice selection assistance information (S-NSSAI) based on the subscription to the event exposure service;
identifying second information on a load level of a network slice instance corresponding to the S-NSSAI;
identifying analytics associated with the S-NSSAI based on the first information and the second information; and
transmitting, to a network slice selection function (NSSF) entity, the analytics associated with the S-NSSAI.

2. The method of claim 1,
wherein reception of the first information is based on the registration of the UE,
wherein the registration of the UE is based on a registration request message including the S-NSSAI, and
wherein the registration request message is transmitted by the UE toward the AMF entity.

3. The method of claim 2, wherein the reception of the first information is further based on information of an area of interest.

4. The method of claim 1, wherein the UE corresponds to a subscription permanent identifier (SUPI).

5. A network data analytics function (NWDAF) entity in a communication system, the NWDAF entity comprising:
a transceiver; and
a processor configured to:
subscribe to an event exposure service of an access and mobility management function (AMF) entity, wherein the event exposure service is for notification of an event based on registration of a user equipment (UE),
identify first information associated with the UE registered to single-network slice selection assistance information (S-NSSAI) based on the subscription to the event exposure service,
identify second information on a load level of network slice instance corresponding to the S-NSSAI,
identify analytics associated with the S-NSSAI based on the first information and the second information, and
transmit, to a network slice selection function (NSSF) entity via the transceiver, the analytics associated with the S-NSSAI.

6. The NWDAF entity of claim 5,
wherein reception of the first information is based on the registration of the UE,
wherein the registration of the UE is based on a registration request message including the S-NSSAI, and
wherein the registration request message is transmitted by the UE toward the AMF entity.

7. The NWDAF entity of claim 6, wherein the reception of the first information is further based on information of an area of interest.

8. The NWDAF entity of claim 5, wherein the UE corresponds to a subscription permanent identifier (SUPI).

* * * * *

UNITED STATES PATENT AND TRADEMARK OFFICE
CERTIFICATE OF CORRECTION

| | |
|---|---|
| PATENT NO. | : 11,432,174 B2 |
| APPLICATION NO. | : 16/592536 |
| DATED | : August 30, 2022 |
| INVENTOR(S) | : Shariat et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 165 days.

Signed and Sealed this
Thirteenth Day of February, 2024

Katherine Kelly Vidal
*Director of the United States Patent and Trademark Office*